United States Patent
Reisig

(10) Patent No.: US 12,485,955 B2
(45) Date of Patent: Dec. 2, 2025

(54) POWER STEERING ASSIST MECHANISM REDUNDANT ROTOR COUPLING ASSEMBLY

(71) Applicant: Steering Solutions IP Holding Corporation, Saginaw, MI (US)

(72) Inventor: Jeremy Reisig, Frankenmuth, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 546 days.

(21) Appl. No.: 17/978,664

(22) Filed: Nov. 1, 2022

(65) Prior Publication Data
US 2024/0140524 A1  May 2, 2024

(51) Int. Cl.
*B62D 5/04* (2006.01)

(52) U.S. Cl.
CPC ......... *B62D 5/0454* (2013.01); *B62D 5/0409* (2013.01)

(58) Field of Classification Search
CPC ....... B62D 5/0454; B62D 5/0409; F16D 3/68; F16D 3/50
See application file for complete search history.

(56) References Cited

U.S. PATENT DOCUMENTS

| | | | | |
|---|---|---|---|---|
| 2008/0035414 A1* | 2/2008 | Kubota | .................... | F16D 3/68 464/154 |
| 2012/0264525 A1* | 10/2012 | Asa | ........................ | F16D 3/68 464/102 |
| 2015/0041241 A1* | 2/2015 | Yoshikawa | ............... | F16D 3/68 180/444 |
| 2015/0114749 A1* | 4/2015 | Dutsky | .................. | B62D 5/062 180/417 |
| 2015/0298733 A1* | 10/2015 | Moriyama | ............. | B62D 7/224 180/444 |
| 2018/0216719 A1* | 8/2018 | Kim | .................... | F16H 57/0018 |

FOREIGN PATENT DOCUMENTS

WO    WO-2019002184 A1 *  1/2019  ........... B62D 5/0409

* cited by examiner

*Primary Examiner* — Karen Beck
(74) *Attorney, Agent, or Firm* — Dickinson Wright PLLC

(57) ABSTRACT

A rotor coupling assembly for a power steering assist mechanism includes a rotor coupling having a first axial side and a second axial side. The rotor coupling assembly also includes a first rotor coupling adapter having a plurality of teeth extending into a corresponding plurality of windows defined by the rotor coupling on the first axial side of the rotor coupling. The rotor coupling assembly further includes a second rotor coupling adapter having a plurality of teeth extending into a corresponding plurality of windows defined by the rotor coupling on the second axial side of the rotor coupling.

15 Claims, 5 Drawing Sheets

POWER STEERING ASSIST MECHANISM REDUNDANT ROTOR COUPLING ASSEMBLY

FIELD OF THE INVENTION

The present application generally relates to power steering assist mechanism for vehicle steering systems and, more particularly, to a redundant rotor coupling assembly for such systems, as well as a method of assembling the redundant rotor coupling assembly.

BACKGROUND

Vehicles may employ a power steering assist mechanism to provide torque assist to a steering shaft of the vehicle through a worm/worm gear assembly. In some power steering assist mechanisms, there is a need for a rotor coupling sub-system with greater capabilities. Current rotor coupling assemblies include both fixed and flexible plastic rotor couplings which are limited by single-point failure modes and packaging constraints.

Some power steering assist mechanisms suffer from undesirable manufacturing and assembly aspects. The standard design of a coupling system in an electro-mechanical assist system mechanically translates torque between an assisting motor and a driving worm shaft. The connections of this rotor coupling are completed on either end by a slip to transitional fitment of a mating splines. The mating shafts on either end use an external set of teeth to be mated to the internal set of teeth in the rotor coupling as defined by industry standards. To achieve functional performance targets such as lash, durability, and torsional strength, the spline design is created to be a type of transitional fit. This transitional fit is an induced interference fit between the external and internal spline teeth via a clamping ring. This clamping ring exerts an inward pressure on the rotor coupling to reduce the diametrical width of the spline minor at the pitch circle. This reduction is the basis of a transitional fit, where the flanks of the external spline intersect with the flanks of the internal spline. This may be sufficient for providing low lash, i.e. degrees of freedom between spline teeth. However, product wear over usage for a molded plastic component can experience development of lash or torsional loss over time. The defining feature for this loss function is the surface contact patch between the mating spline teeth. While the loss can be mitigated by greater interference, corresponding metrics for hoop stresses and part strength can be negatively effected. Additionally, pocketed gaps between the minors and majors of the corresponding tooth profiles as to not touch the lesser-defined tooth roots are included. The summation of the current fitment is an adequate albeit single-point failure in the system that is dependent on robustness levels to overall stresses in the working system.

SUMMARY

According to one aspect of the disclosure, a rotor coupling assembly for a power steering assist mechanism includes a rotor coupling having a first axial side and a second axial side. The rotor coupling assembly also includes a first rotor coupling adapter having a plurality of teeth extending into a corresponding plurality of windows defined by the rotor coupling on the first axial side of the rotor coupling. The rotor coupling assembly further includes a second rotor coupling adapter having a plurality of teeth extending into a corresponding plurality of windows defined by the rotor coupling on the second axial side of the rotor coupling.

According to another aspect of the disclosure, a power steering assist mechanism includes a motor having a motor output shaft. The power steering assist mechanism also includes an assist mechanism comprising a worm having a splined end portion. The power steering assist mechanism further includes a rotor coupling assembly connecting the motor output shaft and the splined end portion of the worm. The rotor coupling assembly includes a rotor coupling having a first axial side and a second axial side. The rotor coupling assembly also includes a first rotor coupling adapter having a plurality of teeth extending into a corresponding plurality of windows defined by the rotor coupling on the first axial side of the rotor coupling. The rotor coupling assembly further includes a second rotor coupling adapter having a plurality of teeth extending into a corresponding plurality of windows defined by the rotor coupling on the second axial side of the rotor coupling, wherein the first rotor coupling adapter and the second rotor coupling adapter have a geometrically identical shape. The rotor coupling assembly yet further includes a crush rib protrusion formed on one of the plurality of spokes on at least one of the first axial side and the second axial side of the rotor coupling.

According to another aspect of the disclosure, a method of assembling a rotor coupling assembly for a power steering assist mechanism is provided. The method includes inserting a splined end portion of a shaft into a splined receiving aperture of a rotor coupling adapter. The method also includes ultrasonic welding the shaft and the rotor coupling adapter to each other.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
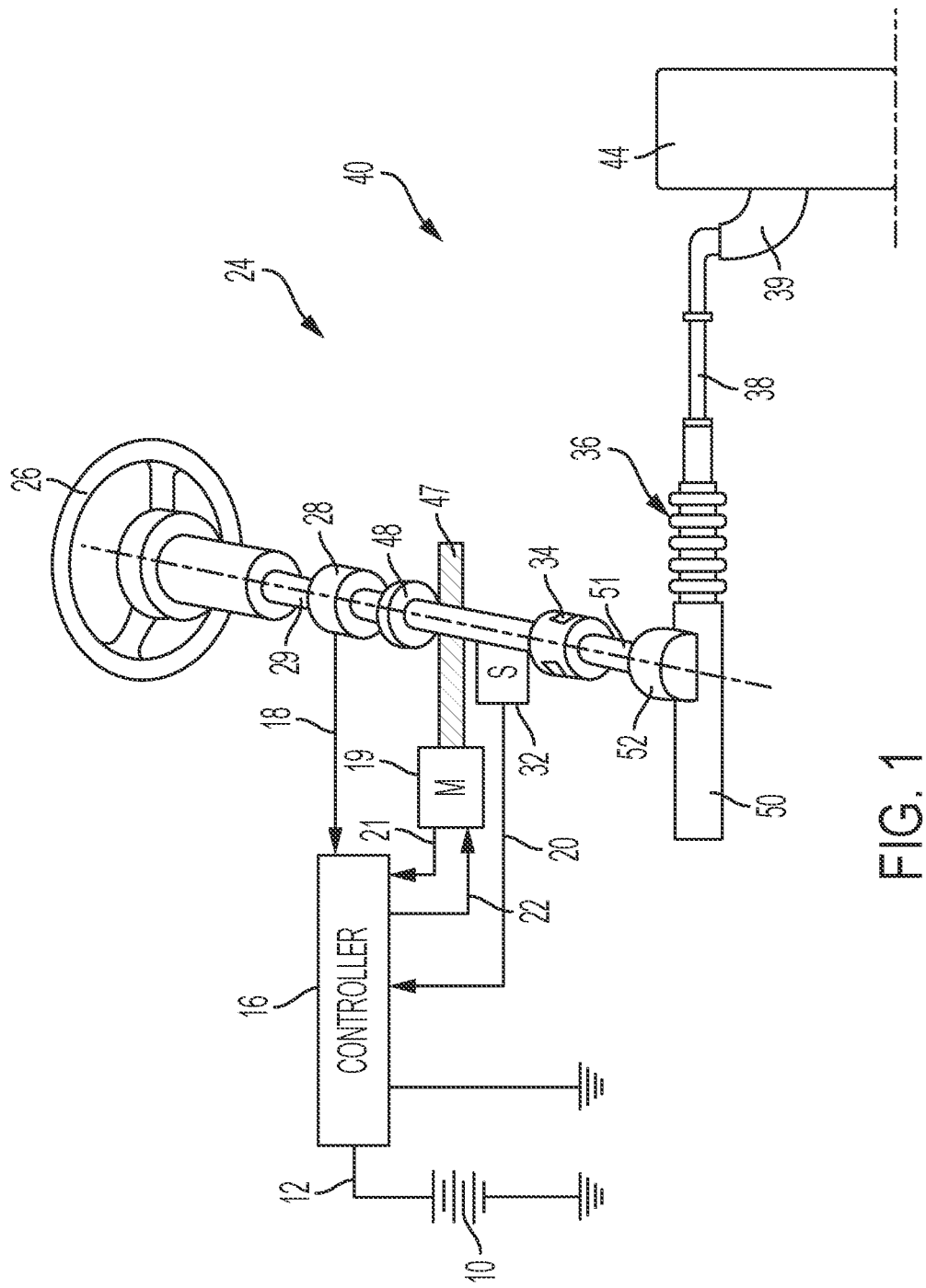
FIG. 1 schematically illustrates an electric power steering (EPS) system.

Referring to the Figures, where the invention will be described with reference to specific embodiments, without limiting same, FIG. 1 illustrates an embodiment of an electric power steering (EPS) system 40 suitable for implementation of the disclosed embodiments. A steering mechanism 36 is a rack-and-pinion type system and includes a toothed rack (not shown) within a housing 50 and a pinion gear (also not shown) located under gear housing 52. As an operator input, hereinafter denoted as a steering wheel 26 (e.g., a hand wheel or the like) is turned, an upper steering shaft 29 turns and a lower steering shaft 51, connected to the upper steering shaft 29 through a universal joint 34, turns the pinion gear. Rotation of the pinion gear moves the rack, which moves tie rods 38 (only one shown), in turn moving steering knuckles 39 (only one shown), which turn steerable road wheel(s) 44 (only one shown).

Electric power steering assist is provided through the control apparatus generally designated by reference numeral 24 and includes a controller 16 and an electric machine 19, which is a permanent magnet synchronous motor, and is hereinafter denoted as motor 19. The controller 16 is powered by the vehicle power supply 10 through line 12. A steering angle is measured through a steering angle position sensor 32, which may be an optical encoding type sensor, variable resistance type sensor, or any other suitable type of position sensor, and supplies to the controller 16 a position signal 20.

As the steering wheel 26 is turned, torque sensor 28 senses the torque applied to the steering wheel 26 by the vehicle operator. The torque sensor 28 may include a torsion bar (not shown) and a variable resistive-type sensor (also not shown), which outputs a variable torque signal 18 to controller 16 in relation to the amount of twist on the torsion bar. Although this is one type of torque sensor, any other suitable torque-sensing device used with known signal processing techniques will suffice. In response to the various inputs, the controller sends a command 22 to the electric motor 46, which supplies torque assist to the steering system through worm 47 and worm gear 48, providing torque assist to the vehicle steering.

Although described above, and illustrated in FIG. 1, as being used in an EPS system with a continuously connected steering column/shaft, it is to be appreciated that any power assist mechanism used in steering systems may benefit from the embodiments disclosed herein. For example, a steer-by-wire or autonomous steering systems are contemplated.

Figure 2:
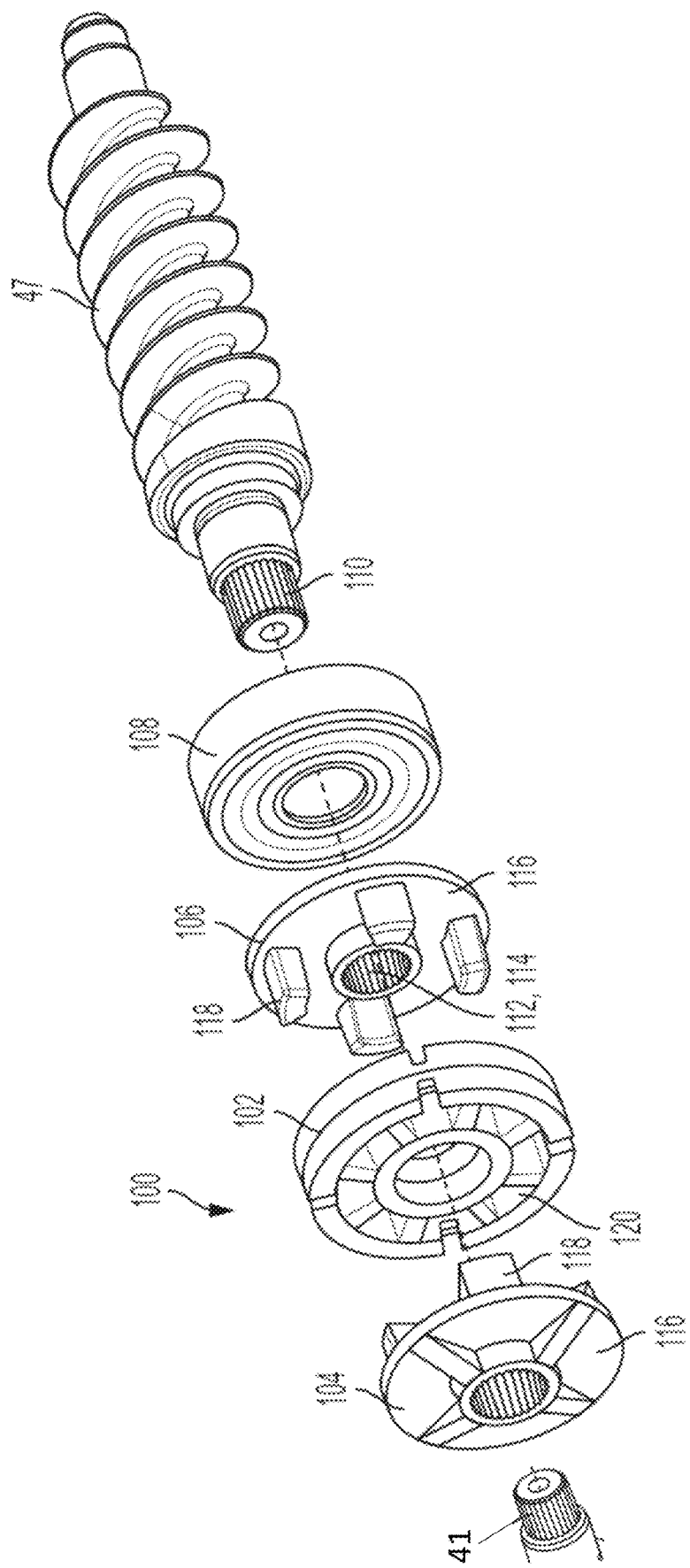
FIG. 2 is a perspective, disassembled view of a rotor coupling assembly for the EPS system.

Referring now to FIG. 2, a rotor coupling assembly 100 is shown in more detail. The rotor coupling assembly 100, when in an assembled condition, couples a motor output shaft 41 of the motor 46 to the worm 47. The rotor coupling assembly 100 includes a rotor coupling 102 and a pair of rotor coupling adapters which are referenced as a first rotor coupling adapter 104 and a second rotor coupling adapter 106. The first rotor coupling adapter 104 is on a side of the rotor coupling 102 which is closer to the motor output shaft 41. The second rotor coupling adapter 106 is on an opposite side of the rotor coupling 102, i.e. closer to the worm 47. In the illustrated embodiment, the second rotor coupling adapter 106 is disposed between the rotor coupling 102 and a bearing 108. Although shown in a disassembled view, it can be appreciated that a splined end region 110 of the worm 47 extends through a central aperture of the bearing 108 and into engagement with internal splines 112 formed on an inner wall 114 which defines a central aperture of the second rotor coupling adapter 106. Similarly, a splined end of the motor output shaft 41 engages the first rotor coupling adapter 104.

Figure 5:
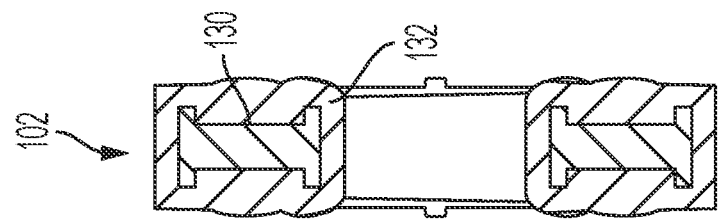
FIG. 5 is a cross-sectional view of the rotor coupling.

Each of the rotor coupling adapters 104, 106 are substantially identical to each other in some embodiments. This is beneficial in manufacturing efforts since a reduction in cost and complexity is obtained. The rotor coupling adapters 104, 106 are formed of plastic. Each rotor coupling adapter 104, 106 has a main plate portion 116 and a plurality of teeth 118 extending from the main plate portion 116. The plurality of teeth 118 on each rotor coupling adapter 104, 106 are circumferentially spaced from each other and positioned to be inserted within a window 120 defined by the rotor coupling 102 (FIG. 5). In the assembled condition, the motor output shaft 41 and the worm 47 are rotationally coupled to each other to transmit torque from the motor to the worm 47. The plurality of teeth 118—and corresponding geometry of windows 120 of rotor coupling 102—may be formed in various contemplated geometries.

Figure 4:
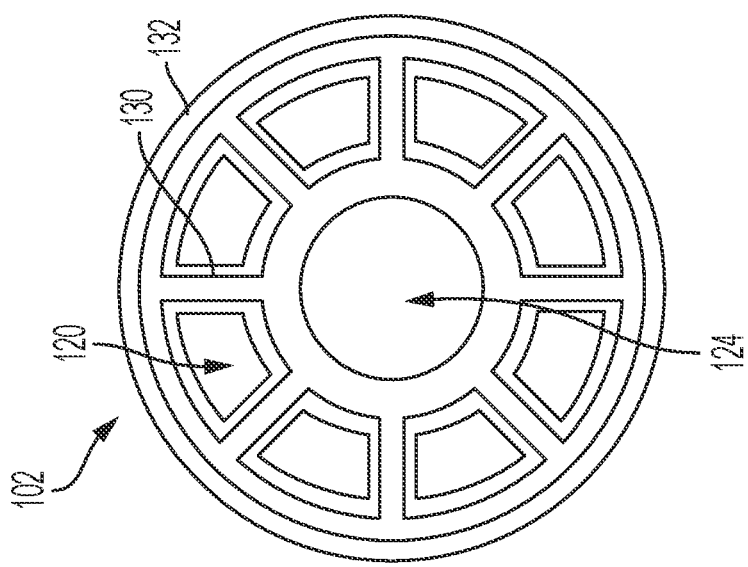
FIG. 4 is an elevation view of the rotor coupling.
Figure 3:
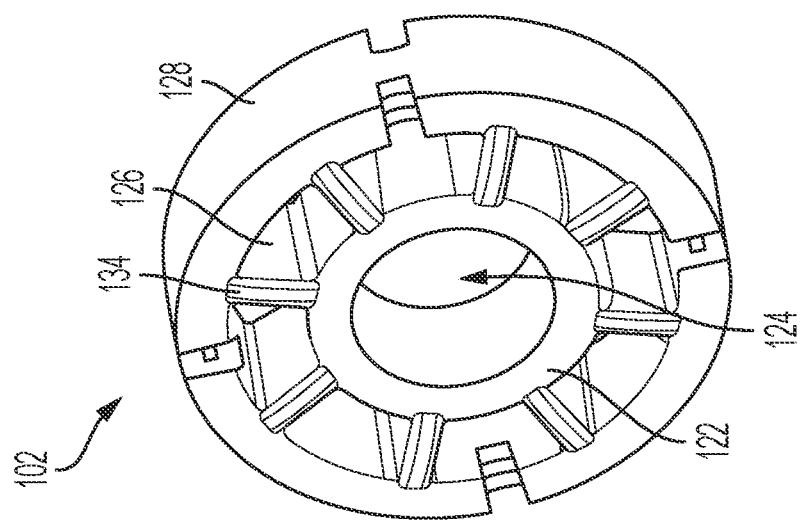
FIG. 3 is a perspective view of a rotor coupling of the rotor coupling assembly.

Referring now to FIGS. 3-5, the rotor coupling 102 is illustrated in greater detail. The rotor coupling 102 includes a hub 122 which defines a central aperture 124. A plurality of spokes 126 extend radially outward from the hub 122 and connect the hub 122 to an outer ring 128. The plurality of spokes 126 are circumferentially spaced from each other and, with the hub 122 and outer ring 128, define the windows 120 of the rotor coupling 102.

As shown in FIGS. 4 and 5, the rotor coupling 102 is formed with a substrate 130 that defines a skeleton structure which is overmolded with a flexible overmold structure 132. In some embodiments, the substrate 130 is formed of a glass-filled plastic and the flexible overmold structure 132 is formed of a thermoplastic polyurethane (TPU) elastomer. Regardless of the precise materials utilized to form the rotor coupling 102, the substrate 130 is a hard plastic material that is substantially rigid, while the flexible overmold structure 132 is a soft material. The substrate material prevents bowing of the rotor coupling 102. By regulating the plastic deformity with the substrate 130, the life of the rotor coupling is extended since it maintains its shape. The substrate 130 also provides redundancy to the rotor coupling. If the flexible overmold structure 132 were to experience any degradation of material causing face wear, the substrate 130 remains as a fail-safe to continue to transmit torque from the motor 46 to the worm 47 (i.e., power assist mechanism). The rotor coupling 102 provides failure mode mitigation due to broken pieces remaining embodied by the windows 120 of the rotor coupling 102 if any of the plurality of teeth 118 of the rotor coupling adapter 104, 106 were to experience excessive stresses and fracture.

The rotor coupling assembly 100 benefits the system by axiomatically separating the motor functions from the power assist mechanism functions by providing a level of flexibility to the rotor axis. The rotor coupling assembly 100 provides a gimbal nature between the major functional areas, as well as stack forgiveness, friction moderation, and damping effects.

Figure 6:
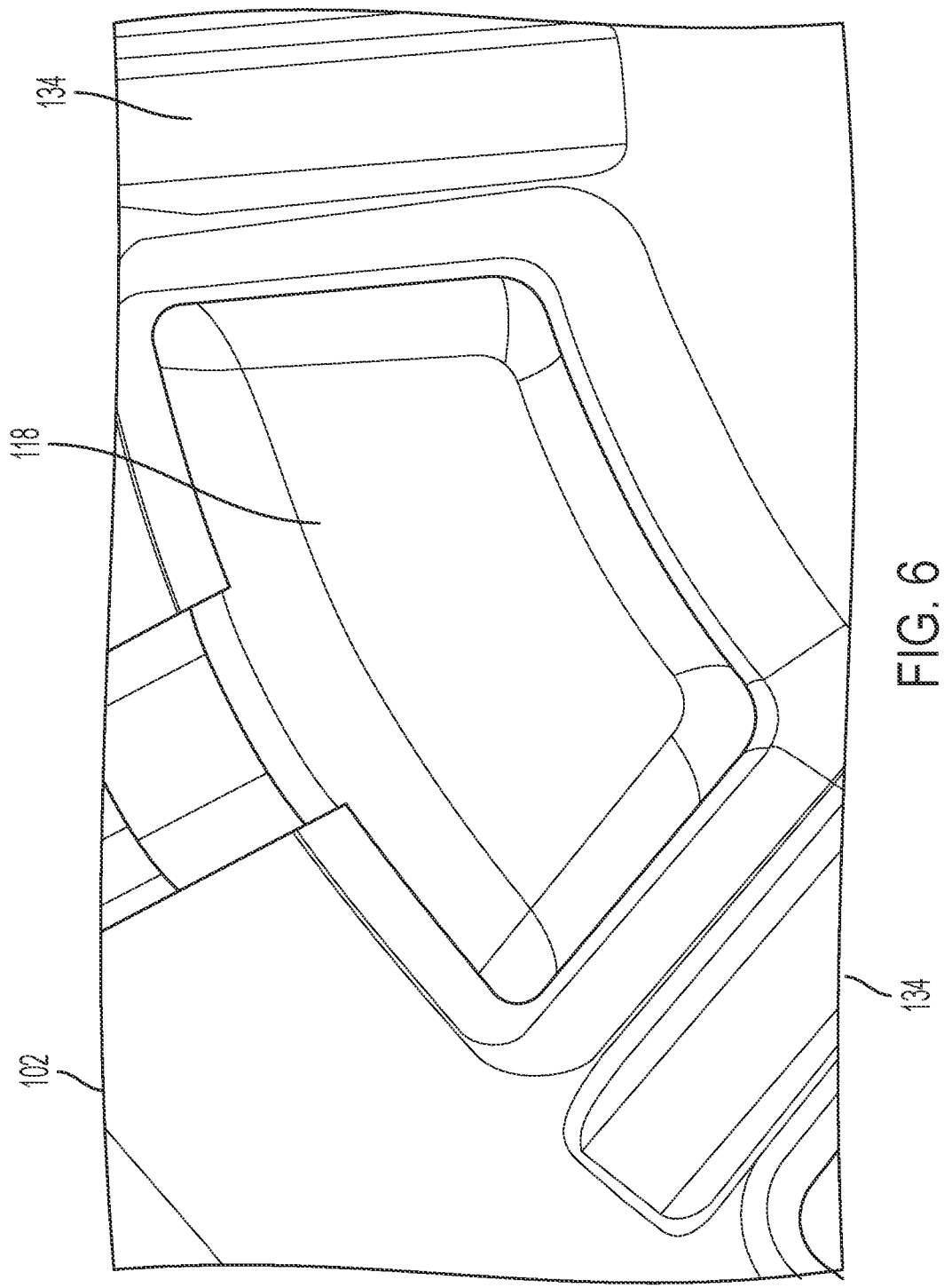
FIG. 6 is a perspective view of a tooth of a rotor coupling adaptor disposed within an opening of the rotor coupling in an assembled condition of the rotor coupling assembly.

Referring again to FIG. 3, a plurality of crush ribs 134 are shown, with a respective crush rib 134 shown on each of the plurality of spokes 126. Referring now to FIG. 6, an enlarged view of one of the teeth 118 is shown in an assembled view within one of the windows 120 of the rotor coupling 102. As shown, a crush rib 134 is included on the rotor coupling 102 on each side of the windows 120. While a crush rib 134 may be included between every pair of adjacent windows 120 on each side of the rotor coupling 102, it is contemplated that fewer crush ribs 134 may be present in some embodiments.

The crush ribs 134 are protrusions on a face of the rotor coupling 102, and more particularly on the spokes 126. In the illustrated embodiments, the crush ribs 134 are shaped as arced protrusions, but it is to be appreciated that other shapes are possible in some embodiments. Since the crush ribs 134 are located on an axial face of the rotor coupling 102, in assembly the rotor coupling adapters 104, 106 slightly compress these crush ribs 134. This provides a localized radial expansion of material against the teeth 118 of the rotor coupling adapters 104, 106 to ensure a lash-free interface in operational rotation throughout the life of the part. The volumetric lock in the assembly of these parts, along with the substrate 130, reduce elastomer creep through durability.

In lower output applications, some or all of the crush ribs 134 could be extended for additional uses. The compression forces in the rotor coupling 102 could be used as a de-lashing feature replacement for existing components. In brush applications, an O-Ring is used to de-lash the inner race of the inboard bearing 108. The rotor coupling adapters 104, 106 may contact the inner race of the bearing 108 instead, and use the preload of the rotor coupling assembly 100 to de-lash the movement of the bearing race. In a similar manner, the preload can provide a de-lash to the motor shaft axis.

The rotor coupling adapters 104, 106 are formed identically in some embodiments. The commonality of the parts for both the assist mechanism (e.g., worm 47) and motor side assemblies avoids the need for different manufacturing processes for each rotor coupling adapter 104, 106. This can create a significant cost benefit, in combination with the non-metallic material of the adapters 104, 106. The rotor coupling assembly 100 is controlled by a press to end stop feature 150 in the rotor coupling adapters 104, 106, which minimizes stack variation in the overall assembly.

Figure 8:
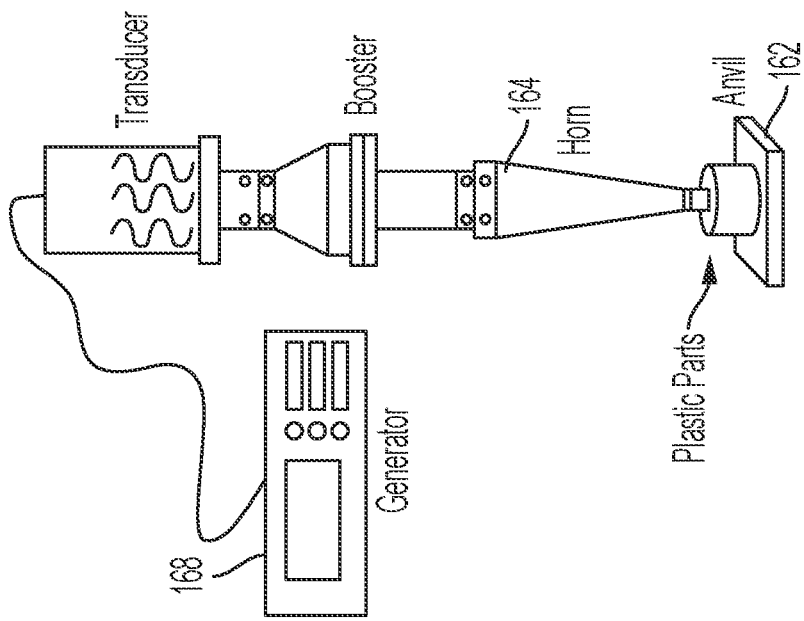
FIG. 8 is a perspective view of a machine used in the method of assembling the rotor coupling assembly of FIG. 7.
Figure 7:
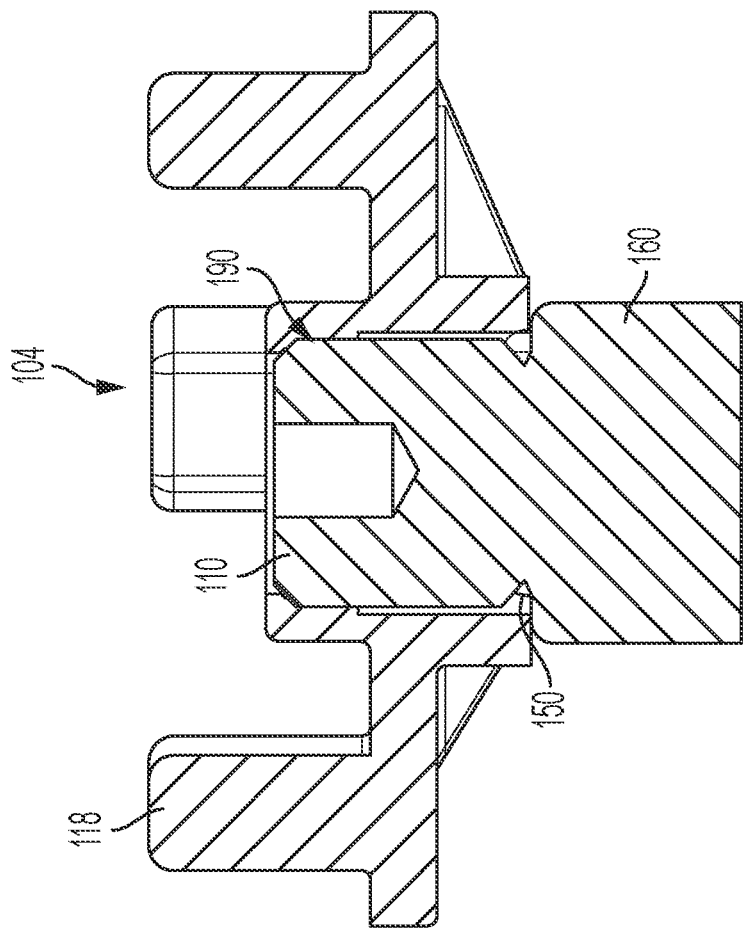
FIG. 7 is a cross-sectional view of a shaft coupled to the rotor coupling adapter according to a method of assembling the rotor coupling assembly according to one aspect of the disclosure.

Referring now to FIGS. 7 and 8, a method of ultrasonic welding is used to create the fitment between the rotor coupling adapters 104, 106 and the splined end portion 110 of the worm 47 or another mating shaft (referred to generically herein with reference numeral 160), such as the motor output shaft. Ultrasonic welding is used in this method to locally plasticize material to allow it to flow or conform to the shape of the external spline tooth.

During assembly of the rotor coupling adapter 104, 106 to the mating shaft 160, the shaft 160 is held in an anvil fixture 162 by a datum in the vertical orientation. The rotor coupling adapter 104, 106 features a variable spline definition along the length of the internal spline depth. The initial depth is a complete clearance to the mating shaft 160 as a starting feature prior to ultrasonic welding. The ending depth features a complete interference fit, represented by interference fit region 190. This section represents the weldable material that will be plasticized in the operation. FIG. 7 illustrates this plasticization. By plasticizing the working material, the plastic flows and conforms to the individual tooth design on the external spline. This fitment area eliminates tooth errors, such as form errors that are a common challenge for a rolled external spline.

As shown in FIG. 8, the ultrasonic weld assembly is formed by introducing a vibratory input to the plastic rotor coupling adapter 160 as it becomes pressed downward onto the mating shaft 160. The ultrasonic weld assembly is comprised of the anvil feature 162 to hold the shaft 160 via a datum, as well as a conical horn 164 which provides the high frequency vibrations. These vibrations are introduced by a generator machine 168 through a transducer and into the working horn 164.

The ultrasonic weld contains working inputs to create plasticization in the formation of the assembly. In some embodiments, by way of non-limiting example, the input frequency is 20 kHz of signal, the weldable time is 2.3 seconds with a hold time of 0.5 seconds.

The improved quality metrics from the assembly process described herein are lash, torsional rates, and durability. In essence, the contact patch between the internal and external teeth becomes greater with less error. This not only reduces the backlash between tooth forms over life, but provides a greater normal area as the assembly rotationally operates. Greater surface area is synonymous with strength metrics for ultimate torque and overall durability. The greater contact area also increases the assembly rate, which improves feedback in the electro-mechanical relationship. A final improvement can be noted by cycle time, to which a productionized ultrasonic weld has the potential for reduced cycle time over a press operation or manual assembly.

This rotor coupling 102 provides an axially de-lashing force to "sandwich" the rotor coupling adapter 104, 106 between the rotor coupling 102 and a supporting datum. This method detents the rotor coupling adapter 104, 106 from an instance of breakaway that would allow it to have theoretical minor movements along the mating external spline. In some embodiments, an angled external spline may be used to address this effect to provide robustness in both the axial and radial directions.

While the technical solutions are described in detail in connection with only a limited number of embodiments, it should be readily understood that the technical solutions are not limited to such disclosed embodiments. Rather, the technical solutions can be modified to incorporate any number of variations, alterations, substitutions, or equivalent arrangements not heretofore described, but which are commensurate with the spirit and scope of the technical solutions. Additionally, while various embodiments of the technical solutions have been described, it is to be understood that aspects of the technical solutions may include only some of the described embodiments. Accordingly, the technical solutions are not to be seen as limited by the foregoing description.

What is claimed is:

1. A rotor coupling assembly for a power steering assist mechanism comprising:
   a rotor coupling having a first axial side and a second axial side, wherein the rotor coupling comprises a substrate portion and an overmolded portion, wherein the overmolded portion completely surrounds the substrate portion;
   a first rotor coupling adapter having a plurality of teeth extending into a corresponding plurality of windows defined by the rotor coupling on the first axial side of the rotor coupling; and
   a second rotor coupling adapter having a plurality of teeth extending into a corresponding plurality of windows defined by the rotor coupling on the second axial side of the rotor coupling.

2. The rotor coupling assembly of claim 1, wherein the first rotor coupling adapter and the second rotor coupling adapter are formed of plastic.

3. The rotor coupling assembly of claim 1, wherein the first rotor coupling adapter and the second rotor coupling adapter have a geometrically identical shape.

4. The rotor coupling assembly of claim 1, wherein the substrate portion is formed of glass-filled plastic.

5. The rotor coupling assembly of claim 1, wherein the overmolded portion is formed of an elastomer material.

6. The rotor coupling assembly of claim 1, wherein the rotor coupling comprises a hub portion defining a central aperture, a plurality of spokes extending radially away from the hub portion, and an outer ring portion.

7. The rotor coupling assembly of claim 6, further comprising a crush rib protrusion formed on one of the plurality of spokes on at least one of the first axial side and the second axial side of the rotor coupling.

8. The rotor coupling assembly of claim 6, further comprising a plurality of crush rib protrusions, wherein each of the plurality of spokes has a respective one of the plurality of crush rib protrusions the first axial side and the second axial side of the rotor coupling.

9. A power steering assist mechanism comprising:
a motor having a motor output shaft;
an assist mechanism comprising a worm having a splined end portion; and
a rotor coupling assembly connecting the motor output shaft and the splined end portion of the worm, the rotor coupling assembly comprising:
a rotor coupling having a first axial side and a second axial side, wherein the rotor coupling comprises a substrate portion and an overmolded portion, wherein the overmolded portion completely surrounds the substrate portion;
a first rotor coupling adapter having a plurality of teeth extending into a corresponding plurality of windows defined by the rotor coupling on the first axial side of the rotor coupling;
a second rotor coupling adapter having a plurality of teeth extending into a corresponding plurality of windows defined by the rotor coupling on the second axial side of the rotor coupling, wherein the first rotor coupling adapter and the second rotor coupling adapter have a geometrically identical shape; and
a crush rib protrusion formed on one of the plurality of spokes on at least one of the first axial side and the second axial side of the rotor coupling.

10. The power steering assist mechanism of claim 9, wherein the first rotor coupling adapter and the second rotor coupling adapter are formed of plastic.

11. The power steering assist mechanism of claim 9, wherein the substrate portion is formed of glass-filled plastic.

12. The power steering assist mechanism of claim 9, wherein the overmolded portion is formed of an elastomer material.

13. The power steering assist mechanism of claim 9, wherein the rotor coupling comprises a hub portion defining a central aperture, a plurality of spokes extending radially away from the hub portion, and an outer ring portion.

14. The power steering assist mechanism of claim 13, further comprising a plurality of crush rib protrusions, wherein each of the plurality of spokes has a respective one of the plurality of crush rib protrusions the first axial side and the second axial side of the rotor coupling.

15. A method of assembling a rotor coupling assembly for a power steering assist mechanism, the method comprising:
inserting a splined end portion of a shaft into a splined receiving aperture of a rotor coupling adapter; and
ultrasonic welding the shaft and the rotor coupling adapter to each other, wherein ultrasonic welding the shaft and the rotor coupling adapter is done at 20 Hz for a weldable time of 2.3 seconds with a hold time of 0.5 seconds.

* * * * *